R. F. ROGERS.
DEVICE FOR SECURING PARTS TO SHAFTS, &c.
APPLICATION FILED MAR. 8, 1910. RENEWED MAY 1, 1914.
1,116,845.
Patented Nov. 10, 1914.
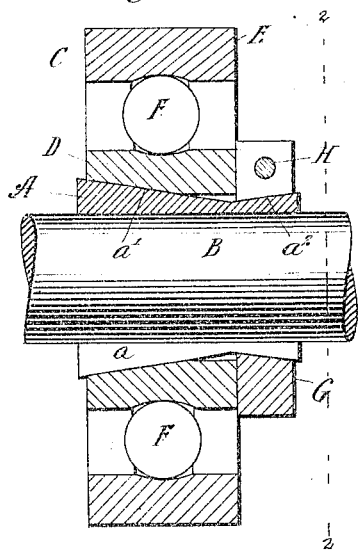
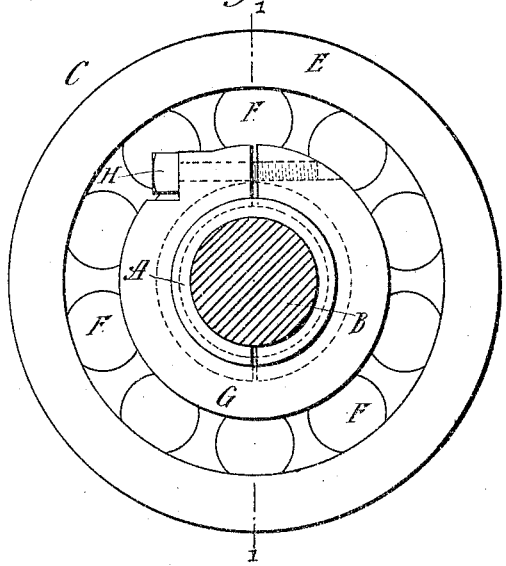
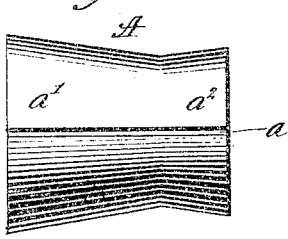
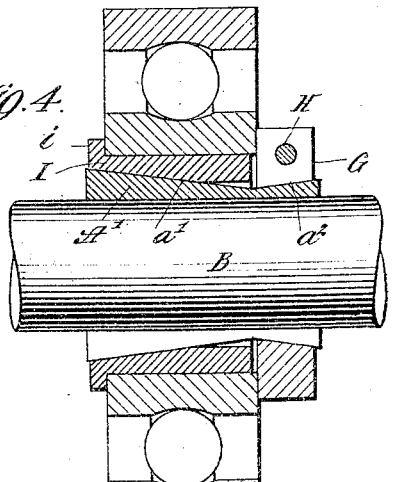
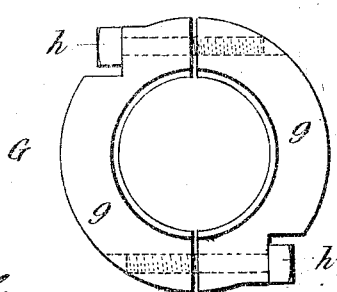

UNITED STATES PATENT OFFICE.

ROBERT FLETCHER ROGERS, OF NEW YORK, N. Y., ASSIGNOR, BY MESNE ASSIGNMENTS, TO THE HESS-BRIGHT MANUFACTURING COMPANY, OF PHILADELPHIA, PENNSYLVANIA, A CORPORATION OF DELAWARE.

DEVICE FOR SECURING PARTS TO SHAFTS, &c.

1,116,845.   Specification of Letters Patent.   Patented Nov. 10, 1914.

Application filed March 8, 1910, Serial No. 548,061. Renewed May 1, 1914. Serial No. 835,767.

*To all whom it may concern:*

Be it known that I, ROBERT FLETCHER ROGERS, a citizen of the United States, residing at New York, in the county of New York and State of New York, have invented certain new and useful Improvements in Devices for Securing Parts to Shafts, &c., of which the following is a specification, reference being had therein to the accompanying drawing.

The object of this invention is to provide an inexpensive, simple and effective device for securing parts—such as pulleys, anti-friction bearings, and the like—to shafts or supports, in such manner that there will be no liability of the parts working loose or separating, and the invention consists of a contractible sleeve to surround the shaft and give support to the parts to be secured, which sleeve is provided with an inwardly tapered portion, and a clamping device mounted on the said tapered portion and serving by its clamping action to prevent the sleeve from moving endwise; whereby the clamping device will not only be prevented by said tapered portion from escaping from the same, but will have a tendency in its clamping action to move longitudinally against the supported parts.

In the accompanying drawings: Figure 1 is a longitudinal section on the line 1—1 of Fig. 2 of my improved device applied to secure an anti-friction bearing to its supporting shaft, the inner casing member of the bearing having a conical bore. Fig. 2 is a transverse sectional elevation of the same on the line 2—2 of the preceding figure. Fig. 3 is a side elevation of the contractible sleeve removed. Fig. 4 is a longitudinal section showing my improved device applied to an anti-friction bearing having a straight cylindrical bore. Fig. 5 is an end elevation of the clamping device.

Referring to Figs. 1, 2 and 3, A represents a sleeve or bushing surrounding a shaft or support B, and split longitudinally and preferably entirely through one side as at $a$, to enable it to be contracted on the shaft. The sleeve is in turn surrounded by an anti-friction bearing C, consisting of an inner casing member D, an outer casing member E, and interposed rolling elements F. The outer surface of the contractible sleeve is tapered as at $a'$ for the main portion of its length, and constitutes a supporting surface for the inner casing member of the bearing, which latter is correspondingly tapered to fit the sleeve, so that when the latter is forced longitudinally into the casing member, the tapered surfaces coöperating with each other will contract the sleeve and cause the same to bind firmly and fixedly on the shaft. The end of the sleeve, where it projects beyond the anti-friction bearing, is tapered as at $a^2$ inwardly toward the supported parts, and in a direction opposite to that of the main portion, and on this inwardly tapered portion is mounted a clamping device G, in the form of a ring, split longitudinally through its side, so that it may be contracted, a clamping bolt H being screwed into the meeting ends of the ring to draw them together, and the bore of the ring being tapered or inclined to correspond with that of the sleeve. As a result of this construction, the projecting end of the contractible sleeve may be held in contracted condition firmly around the supporting shaft, which action is independent of that caused by the forcible engagement of the main portion of the sleeve within the bore of the casing member, whereby the sleeve may be held fixedly and firmly on the shaft against endwise movement. By reason of the inward taper of the projecting end of the sleeve, the surrounding clamping ring will be effectually prevented from escaping endwise therefrom in the event of the parts becoming loose. Furthermore, it will be seen that by reason of the coöperation of the inward taper on the sleeve and the corresponding taper on the clamping ring, the clamping action of the latter exerted in a transverse direction will tend to cause the ring to move longitudinally toward the supported bearing, and abutting against the same will have the effect of more forcibly binding the casing member of the bearing with a wedging effect on the sleeve. In applying the device, the contractible sleeve is first slipped over the shaft, and the casing member is then passed over the smaller end of the sleeve, and the latter forcibly driven longitudinally into said member, the result being that the inclined surfaces coöperating, the sleeve will be forcibly contracted firmly on the shaft. The clamping ring is then applied over the inwardly tapered portion of the sleeve, and its clamping bolt tightened up, with the result that the ring will be contracted tightly at this point and firmly clamped to the sleeve, the ring at the same time moving longitudinally against the casing member and wedging the same the more tightly on the sleeve.

In Fig. 4, the form and operation of the parts are the same as those just described, with the exception that the bore of the casing member in this case is straight or cylindrical, and an intermediate contractible collar I is applied within the straight bore and around the main tapered portion of the sleeve, this collar having a straight cylindrical exterior surface and a tapered interior surface or bore to correspond with the exterior of the sleeve. At one end, that opposite where the clamping device is applied, the collar is formed with a laterally projecting flange i forming an abutment against which the casing member is seated. In securing these parts in position, after the sleeve has been driven into the collar, the clamping ring is contracted and will move longitudinally, and, abutting against the side of the casing member, will firmly clamp the same longitudinally against the annular shoulder on the collar, its tendency thus being to force the collar endwise and expand the same tightly within the casing member.

By reason of the construction described, I am enabled to firmly connect the bearing to the shaft without the use of screw-threads, which have heretofore been employed for moving the parts endwise to cause them to bind. In the present device, the endwise movement of the parts is effected by a forcible driving action of the contractible sleeve, so that it is possible to engage them with greater tightness and firmness than by the use of screw-threads. Furthermore, by reason of the inward taper on the end of the sleeve, the clamping ring will be effectually prevented from escaping in case of looseness; and by the coöperation of the tapered bore of the clamping ring with the end of the sleeve, the ring in its transverse clamping action will tend to move toward and against the casing member, thereby tending to further tighten the same on the contractible sleeve and to maintain the latter, without liability of looseness, in firm engagement with the shaft.

In the accompanying drawings I have illustrated my invention in the forms which I deem suitable for the ends in view, but it will be understood that the invention is not limited to any particular details except in so far as such limitations are specified in the claims.

Having thus described my invention, what I claim is:—

1. A device for securing parts to shafts or supports, said device comprising a contractible sleeve adapted to surround the shaft and give support to said parts, and provided with an inwardly tapered portion, and a clamping device applied to said tapered portion.

2. A device for securing parts to shafts or supports, said device comprising a contractible sleeve adapted to surround the shaft and give support to said parts, and provided with an inwardly tapered portion, and a clamping device mounted on said tapered portion and adapted to abut against the supported part.

3. A device for securing parts to shafts or supports, said device comprising a contractible sleeve adapted to surround the shaft and provided with oppositely tapered portions, one of which is adapted to give support to the said parts, and a clamping device mounted on the other tapered portions of the sleeve.

4. A device for securing parts to shafts or supports, said device comprising a contractible sleeve adapted to surround the shaft and give support to said parts, and a transversely-acting clamping device applied to the sleeve, the form and relation of the device and sleeve being such that the transverse clamping operation of the device will act to force the same longitudinally of the shaft.

In testimony whereof I have affixed my signature in presence of two witnesses.

ROBERT FLETCHER ROGERS.

Witnesses:
WM. J. DOLAN,
L. E. MORRISON.